(12) United States Patent
Altman et al.

(10) Patent No.: US 8,604,365 B2
(45) Date of Patent: Dec. 10, 2013

(54) ULTRASONIC DIGITIZER AND HOST

(75) Inventors: Nathan Altman, RaAnana (IL); Meir Agassy, Ramat-Gan (IL); Vadim Winebrand, Hod-HaSharon (IL); Michael Kokarev, Haifa (IL); Moti Shor-Haham, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 12/811,702

(22) PCT Filed: Jan. 4, 2009

(86) PCT No.: PCT/IL2009/000014
§ 371 (c)(1),
(2), (4) Date: Sep. 16, 2010

(87) PCT Pub. No.: WO2009/083993
PCT Pub. Date: Jul. 9, 2009

(65) Prior Publication Data
US 2011/0015893 A1 Jan. 20, 2011

Related U.S. Application Data

(60) Provisional application No. 61/006,267, filed on Jan. 3, 2008.

(51) Int. Cl.
*G09G 5/00* (2006.01)

(52) U.S. Cl.
USPC .................. 178/18.04; 178/19.01; 178/19.02

(58) Field of Classification Search
USPC .................................... 178/18.4, 19.01–19.02
See application file for complete search history.

(56) References Cited

U.S. PATENT DOCUMENTS

| | | | | |
|---|---|---|---|---|
| 4,883,926 A | * | 11/1989 | Baldwin | 178/19.01 |
| 5,308,936 A | * | 5/1994 | Biggs et al. | 178/19.02 |
| 5,446,834 A | * | 8/1995 | Deering | 345/427 |
| 5,787,414 A | * | 7/1998 | Miike et al. | 715/243 |
| 6,259,597 B1 | | 7/2001 | Anzai et al. | |
| 6,661,653 B1 | * | 12/2003 | Holmen et al. | 361/679.1 |
| 2002/0060665 A1 | | 5/2002 | Sekiguchi et al. | |
| 2004/0085301 A1 | * | 5/2004 | Furukawa et al. | 345/179 |

(Continued)

FOREIGN PATENT DOCUMENTS

| | | |
|---|---|---|
| CN | 1659505 | 8/2005 |
| JP | 10254610 | 9/1998 |

(Continued)

OTHER PUBLICATIONS

Communication Relating to the Results of the Partial International Search Dated Jan. 21, 2010 From the International Searching Authority Re.: Application No. PCT/IL2009/000014.

(Continued)

*Primary Examiner* — William Boddie
*Assistant Examiner* — Leonid Shapiro
(74) *Attorney, Agent, or Firm* — Haynes and Boone, LLP

(57) ABSTRACT

A computing system comprises a processor and internal peripheral devices, and a system bus connecting the internal peripheral devices to the processor. One of the internal peripheral devices is an ultrasonic digitizer that digitizes ultrasonic signals from at least two associated microphones into a digitized audio signal carrying a corresponding location and outputs the digitized audio as a signal on the system bus.

35 Claims, 12 Drawing Sheets

(56) References Cited

U.S. PATENT DOCUMENTS

| 2004/0201580 | A1  | 10/2004 | Fujiwara et al. | |
|---|---|---|---|---|
| 2005/0178839 | A1  | 8/2005  | Grant | |
| 2008/0095401 | A1* | 4/2008  | Saleh et al. | 382/103 |
| 2008/0289159 | A1* | 11/2008 | Solich | 24/571 |

FOREIGN PATENT DOCUMENTS

| JP | 2000112567 A | 4/2000 |
|---|---|---|
| JP | 2002215316 A | 8/2002 |
| JP | 2003044213 A | 2/2003 |
| JP | 2005173672 A | 6/2005 |
| JP | 2005522708 A | 7/2005 |
| JP | 2007280232 A | 10/2007 |
| WO | WO 03/088136 | 10/2003 |
| WO | WO 2005/111653 | 11/2005 |
| WO | WO 2009/083993 | 7/2009 |

OTHER PUBLICATIONS

International Search Report and the Written Opinion Dated Mar. 2, 2010 From the International Searching Authority Re.: Application No. PCT/IL2009/000014.

International Preliminary Report on Patentability Dated Jul. 15, 2010 From the International Bureau of WIPO Re. Application No. PCT/IL2009/000014.

Translation of Office Action Dated Jul. 3, 2012 From the State Intellectual Property Office of the People's Republic of China Re. Application No. 200980107919.8.

Communication Pursuant to Rules 161(1) and 162 EPC Dated Aug. 18, 2010 From the European Patent Office Re. Application No. 09700125.9.

Response Dated Sep. 12, 2010 to Communication Pursuant to Rules 161(1) and 162 EPC of Aug. 18, 2010 From the European Patent Office Re. Application No. 09700125.9.

Examination Report Dated Sep. 24, 2012 From the Intellectual Property Office of New Zealand Re. Application No. 586806.

Examination Report Dated Dec. 16, 2011 From the Intellectual Property Office of New Zealand Re. Application No. 586806.

Communication Pursuant to Article 94(3) EPC Dated Feb. 23, 2012 From the European Patent Office Re. Application No. 09700125.9.

Patent Examination Report Dated Oct. 18, 2012 From the Australian Government, IP Australia Re. Application No. 2009203158.

* cited by examiner

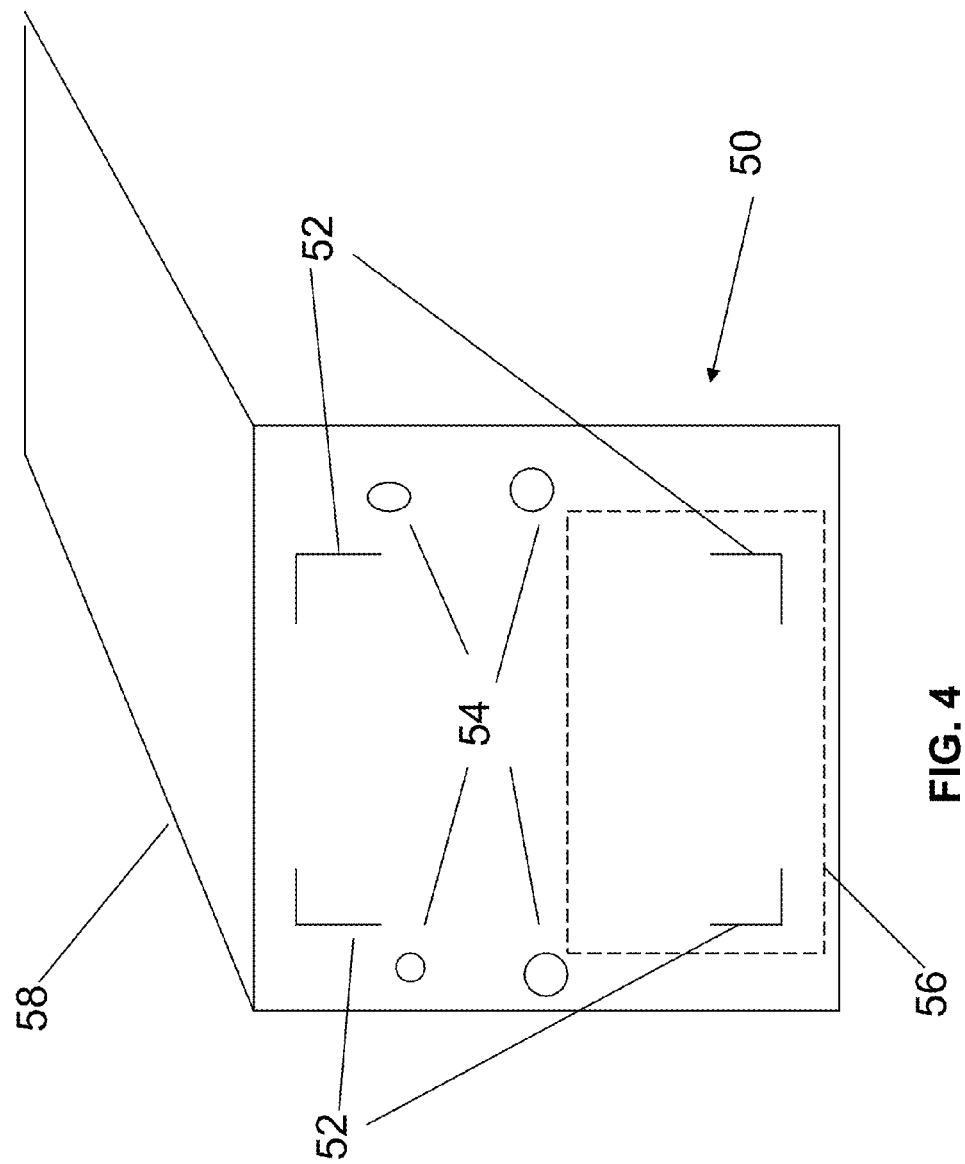

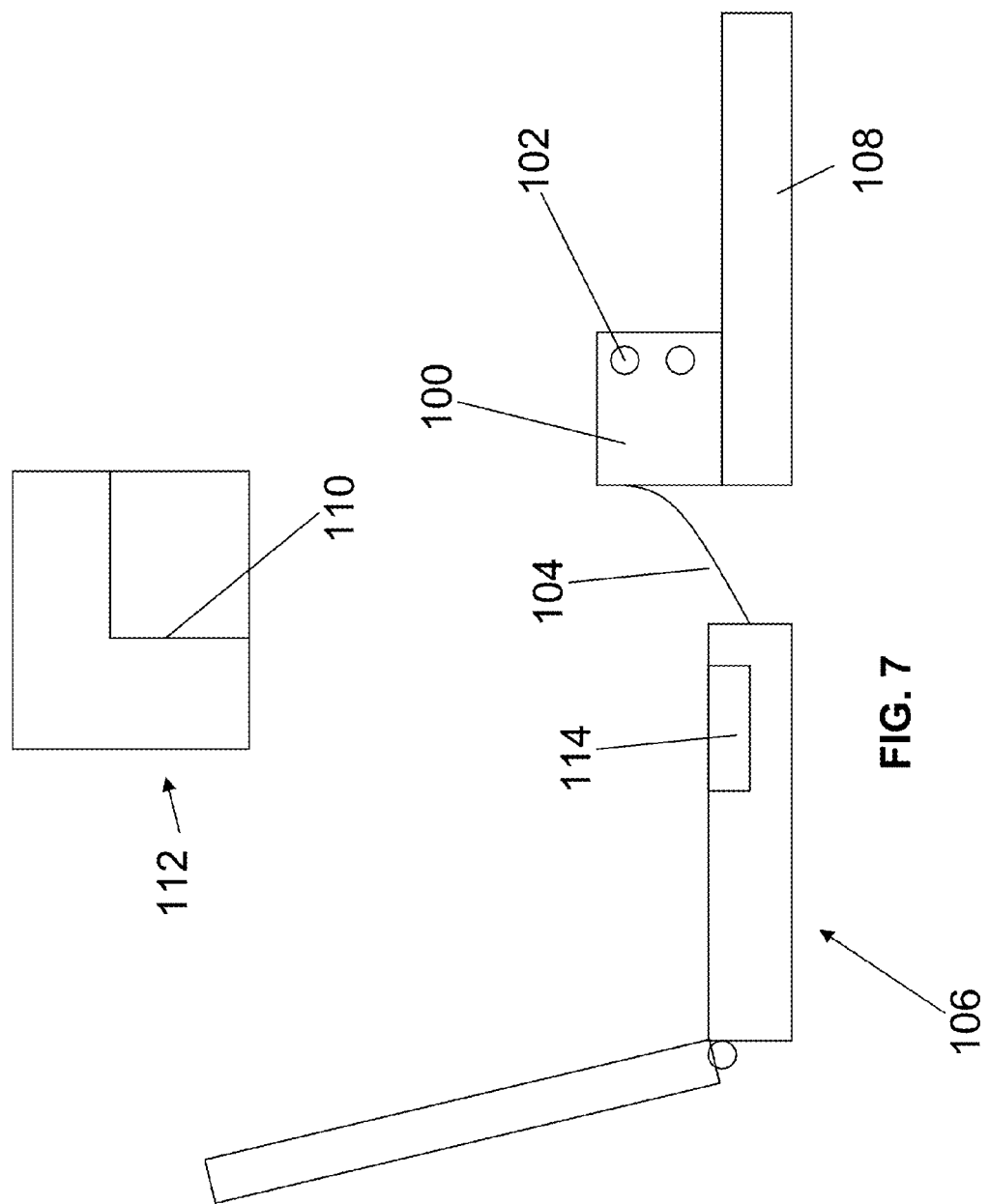

ULTRASONIC DIGITIZER AND HOST

RELATED APPLICATIONS

This Application is a National Phase of PCT Patent Application No. PCT/IL/2009/000014 having International filing date of Jan. 4, 2009, which claims the benefit of U.S. Provisional Patent Application No. 61/006,267 filed on Jan. 3, 2008. The contents of the above Applications are all incorporated herein by reference.

FIELD AND BACKGROUND OF THE INVENTION

The present invention, in some embodiments thereof, relates to an ultrasonic digitizer and host.

Currently there are products which have a digitizer integrated into a host, whether a laptop or desktop computer, or in a more generalized form: a host. Furthermore there are acoustic digitizers provided as external peripherals that may be added to the host, as add-on's.

The suggestion is known to embed an ultrasonic receiver inside a mobile phone or a "smart phone".

There are numerous technologies, that support digitizing, particularly of handwriting:
1) RF tablets: companies, such as Wacom, Acecad, and N-trig, use a pad with an antenna to emit RF energy to a stylus that is located above the pad. This is unsatisfactory since a computer needs a retractable pad, and this makes usage cumbersome. A built-in RF solution has no advantages in contrast with an add-on solution having the same properties.
2) Optical sensor: Anoto is the owner of a technology which uses a special paper with imprinted dots. The stylus has a camera to decode its location based on the dots it sees. In this technology, there is no need to embed the receiver inside the host since it uses standard RF protocols such as Bluetooth to communicate with its host. However, the special paper, bulkiness of the pen and the price, are limiting factors for this technology.
3) Ultrasonic sensor: there are several companies that use ultrasonic TOA measurement to estimate a location of a stylus. Pegasus (Pegatech), Navisis, Virtual ink and others are examples. The enabling technology for these products uses acoustic pulses for measuring the TOA. Acoustic technology has advantages in relation to the previous two technologies described above, namely it can operate on any surface and can allow 3/D applications. However, the known art has inter alia the following disadvantages:
    a. Inferior accuracy and resolution
    b. Size of receiver
    c. Susceptibility to ultrasonic noise
    d. Susceptibility to other users in the vicinity using the same technology
    e. Relatively low sampling rate
    f. Delay between writing and digital representation On the other hand, there are benefits to having handwriting digitization on a computer, for example the following abilities may be obtained:
1) Transferring handwritten notes to a digital format.
2) Controlling the computer (the stylus being used as a mouse).
3) Direct digital input for sketches and drawings.
4) Notes insertion to existing documents, in the same way one can write notes on a printed document.
5) Form filling.
6) 3/D applications.

The following documents were published after the priority date of the present application and thus their prior art effect on the present claims depends on the specific jurisdiction.

WO2008018757 discloses a position-tracing-signal generating apparatus and an input system including a position-tracing input apparatus for inputting information by tracing the position of the position-tracing-signal generating apparatus. The position-tracing-signal generating apparatus is capable of inputting accurately information on the position-tracing by emitting a ultrasonic-wave signal through a guide path formed between a guide part and a ultrasonic-wave signal generating unit in only a paper surface direction irrespective of usage of the position-tracing-signal generating apparatus by user. In addition, according to the position-tracing-signal generating apparatus, a plurality of ultrasonic-wave generating members are provided in the ultrasonic-wave signal generating unit, and the ultrasonic-wave generating members sequentially generate ultrasonic-waves in a predetermined time interval calculated based on separation distances between the ultrasonic-wave generating members so that the ultrasonic-wave signal can be amplified through superposition of the ultrasonic waves generated by the ultrasonic-wave generating members. Accordingly, the position-tracing-signal generating apparatus can also stably transmit the ultrasonic-wave signal to an ultrasonic-wave signal receiving sensor disposed at a long distance.

WO2008048036 teaches a 3D position tracking method and apparatus. The 3D position tracking method and apparatus measures a 3D position of a signal generator by using distances between a signal generator and ultrasonic signal receivers calculated by using differences between a time at which an ultrasonic signal is generated by the signal generator and times at which the ultrasonic signal is received to the ultrasonic signal receivers that are disposed at predetermined intervals to receive the ultrasonic signal, and distances between the ultrasonic signal receivers. Accordingly, a 3D position of a moving object in a 3D space can be accurately measured without excessive costs, and a 3D position tracking method and apparatus as described therein can be applied to a 3D mouse, a 3D pointer, a 3D video game input device, and the like.

SUMMARY OF THE INVENTION

The present embodiments relate to the incorporation of an acoustic digitizer as a built-in component into a host.

According to an aspect of some embodiments of the present invention there is provided a computing system comprising a processor and internal peripheral devices, and a system bus connecting said internal peripheral devices to said processor, wherein one of said internal peripheral devices comprises an ultrasonic digitizer configured for digitization of ultrasonic frequencies, said digitizer digitizing ultrasonic signals from at least two associated microphones into a corresponding digitized audio output and outputs said digitized audio output as a signal on said system bus.

In an embodiment, said digitized audio output comprises a decoded positioning device location.

An embodiment may comprise an internal codec, wherein said ultrasonic digitizer is connected to said internal codec to use said internal codec to decode said locations.

An embodiment may comprise a stylus, the stylus incorporating an ultrasonic transmitter for transmitting its location to said associated microphones to allow user interaction with said computer system, the stylus further comprising a tip for pointing over a surface.

In an embodiment, said tip is a writing tip, and is ink enabled to write on paper, and said system comprises an accommodation assembly for accommodating paper in a defined relationship with said system.

An embodiment may comprise a host computer housing, wherein said paper accommodation system comprises a paper alignment structure, said paper alignment structure comprising a configuration that holds paper in a fixed relationship with said at least two microphones.

In an embodiment, said paper alignment structure is built onto said housing.

In an embodiment, said paper alignment structure configures a part of said housing as a writing pad.

In an embodiment, said housing comprises a keyboard and a covering is extendable over said keyboard to form said writing pad.

In an embodiment, said paper alignment structure comprises a first set of at least two microphones about one side thereof and a second set of at least two microphones about a second side thereof and a selector for selecting between microphones of said respective sides depending on which are receiving a clearer signal.

In an embodiment, said housing comprises a recharging holder for a stylus.

In an embodiment, said paper alignment structure comprises a tensioned clip to hold paper against said housing.

In an embodiment, said tension is one member of the group consisting of rotary tension and linear tension.

In an embodiment, said paper alignment structure comprises a retractable paperweight, said at least two microphones being built into said paperweight, said paperweight being attached via a cord to said host.

An embodiment may comprise a third microphone for three-dimensional location.

A configuration may use said three-dimensional location to compensate for a height of paper in calculating said location.

The system may be such that activation of said digitizer switches said computing system from a dormant to an active state.

In an embodiment, said digitizer comprises a memory that stores user input while said computing system is in a dormant state, which user input is subsequently accessible by said computing system.

The system may be configured to accept input from said digitizer while remaining in an otherwise dormant state.

The system may be configured with a calibration mechanism for detecting size and direction of handwriting and deducing a location or orientation of paper.

An embodiment may comprise a computer housing and wherein said at least two microphones are in a fixed relationship with respect to said housing.

According to a second aspect of the present invention there is provided a computing system comprising a processor having a system clock, and a positioning unit for providing positioning of a positioning device, wherein said processor comprises a codec that digitizes ultrasonic signals of said positioning device received via at least two associated microphones, to provide said processor with a signal further processable into a corresponding positioning device location, and a synchronization unit for synchronizing said system clock for said provided positioning.

In an embodiment, said codec is external to said processor, the system further comprising a decimation filter in parallel with said codec.

An embodiment may comprise a wireless unit that synchronizes with a pointing device, which unit is further configured for receiving data from an additional microphone.

An embodiment may be configured to use a location signal modulated onto a continuous ultrasonic carrier.

An embodiment may comprise a screen and wherein said at least two associated microphones are fixed about said screen to provide a touchscreen application.

In an embodiment the CODEC is internal to said processor.

In an embodiment, said CODEC is external to said processor and wherein said synchronizing for said provided positioning comprises synchronizing said CODEC with said system clock.

In an embodiment, the system comprises a wireless transceiver for synchronization with a pointing device, and said synchronizing for said provided positioning comprises synchronizing said system clock to said wireless transceiver.

In an embodiment, said wireless unit is a system internal unit for wireless networking.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a simplified schematic diagram showing how an internal surface of the host of FIG. 1 can be used for paper location;

FIG. 7 is a schematic diagram in which a paper weight attached by a cord is used to hold the paper and is then retracted into a receptacle on the housing of the host;

DESCRIPTION OF EMBODIMENTS OF THE INVENTION

Figure 1:
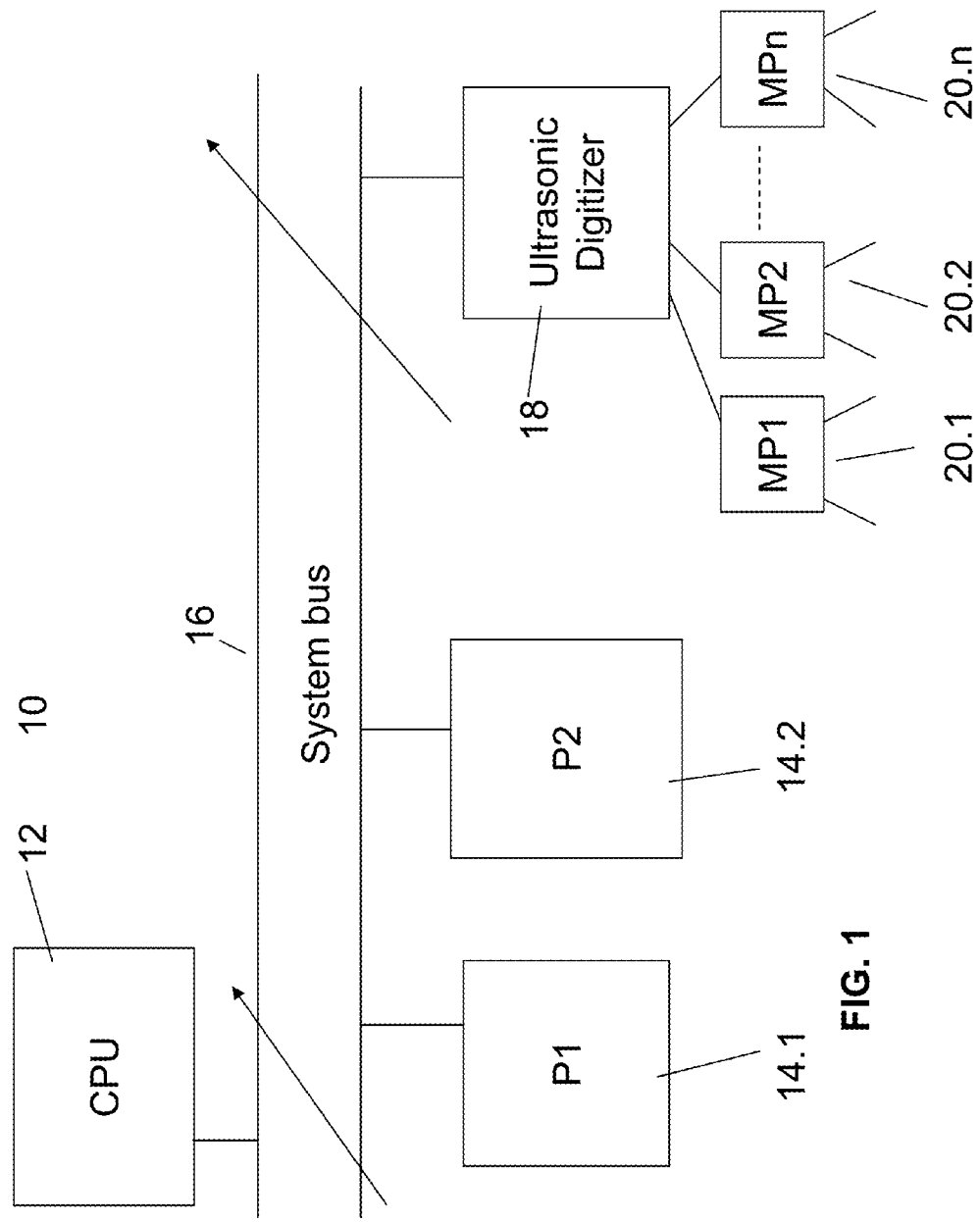
FIG. 1 is a simplified schematic diagram illustrating a computer system that incorporates an ultrasonic digitizer according to a first embodiment of the present invention.

The present invention, in some embodiments thereof, relates to an acoustic digitizer and a corresponding host.

At present, existing ultrasonic technologies are not embedded inside hosts, hosts being computing devices having a major function of their own, including laptops, desktops, digital communication devices, digital cameras etc. They are rather offered as "add on"s for what is called the "after market".

Ultrasonic technology that overcomes the existing limitations of ultrasonic technology, has added value when embedded inside a computer. For example, microphones may be fixed on the housing of the host and locations measured may be in relation to the computer.

One advantage is the ability to provide touch screen applications in which the location of the stylus can be measured in relation to different active regions or soft buttons on a screen. A further advantage is that the computer casing can be constructed for paper to be located in a determined way. The location measured by the microphones fixed on the casing can then be understood in relation to the paper on which the user is writing.

A further advantage of embedding is that an embedded digitizer which has access to an internal bus of the host can operate when the host is in a dormant or standby state. Thus the digitizer could be used to wake the host from the standby state, or to record writing when the computer remains otherwise dormant.

Ultrasonic location may be based on a signal issued by a pointing device such as a stylus. In an embodiment the signal is a continuous signal comprising a location signal modulated onto a continuous ultrasound carrier signal.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Referring now to the drawings, FIG. 1 illustrates a computing system 10 comprising a central processing unit (CPU) 12 and internal peripheral devices 14.1, 14.2 etc such as memory devices of different kinds, sound cards, graphics cards, communications devices etc. An internal system bus 16 connects the internal peripheral devices to the CPU 12. One of the internal peripheral devices is an ultrasonic digitizer 18 that digitizes ultrasonic signals from associated microphones 20.1 . . . 20.n. The ultrasonic signals are from an ultrasonic location device such as a stylus, and the signals from the stylus are digitized to provide the current location of the stylus in relation to the speakers. The digitized output is provided to the system bus 14. The microphones may in embodiments be fixed into the housing of the host computer.

Figure 2:
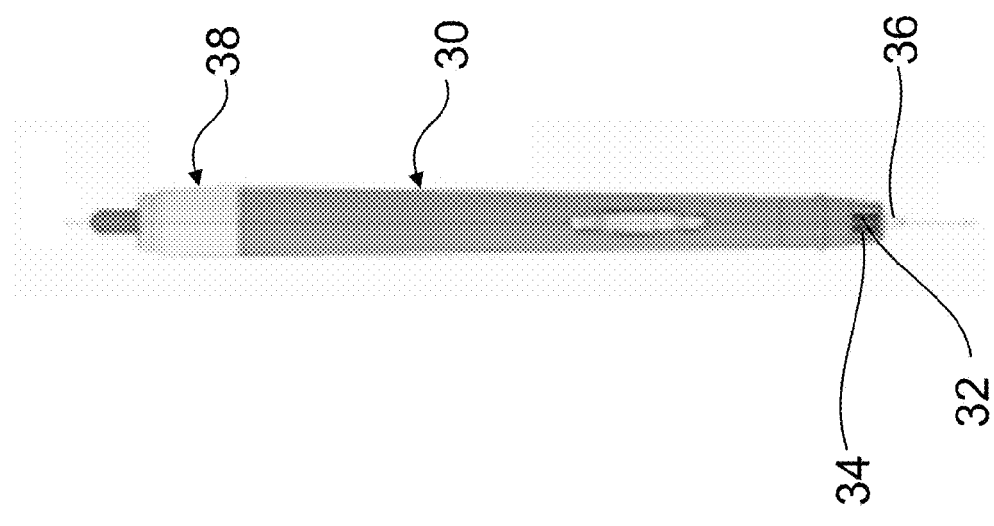
FIG. 2 is a simplified schematic diagram illustrating an ultrasonic stylus for use with the ultrasonic digitizer of FIG. 1.

In an embodiment, the system includes an internal codec. The codec may be part of the CPU 12 or any of the peripheral devices. The ultrasonic digitizer is connected to the internal codec and uses the internal codec to decode the locations. Typically the incoming ultrasound signal is a continuous signal comprising a carrier wave and a modulation onto the carrier wave. The codec may decode the modulations from the different speakers, say using cross-correlation, to accurately extract the time of flight from each speaker. The location can then be determined by triangulation. The ability to make use of an internal codec is an advantage of making the digitizer internal Referring to FIG. 2, the ultrasonic signal may come from a stylus such as stylus 30. Such a stylus may incorporate an ultrasonic transmitter 32 inside a protective cage 34 and co-located with a pen tip 36 which emerges from the cage for writing on a writing surface such as paper.

The stylus transmits its location to the associated microphones and allows user interaction with the computer system.

An additional transmitter 38 may be provided as desired at the far end of the stylus to provide information on the orientation of the stylus.

The writing tip may use ink, or any other writing medium such as pencil graphite to write on the paper or other writing surface.

Figure 3:
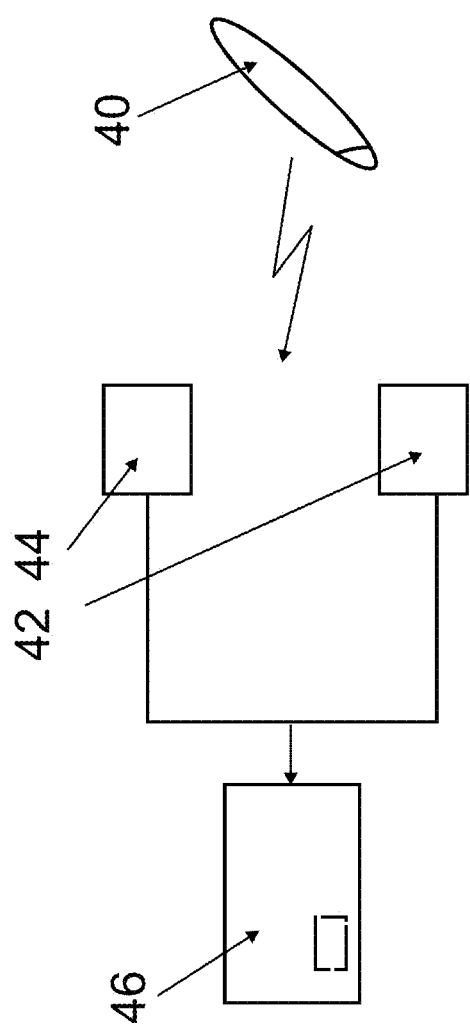
FIG. 3 is a simplified schematic diagram illustrating a location system comprising the digitizer of FIG. 1, the stylus of FIG. 2 and a microphone array.

Referring now to FIG. 3, the stylus 40 transmits its location to two microphones 42 and 44, which in turn pass the signals to ultrasonic digitizer 46.

The paper may be freely set at any location where the stylus is in range of the microphones. However accuracy is improved if the paper is set at a defined location so that the relationship between the paper and the location of the stylus is clear. The system may thus include an accommodation assembly which accommodates paper or any other writing surface in a defined relationship with the system.

Reference is now made to FIG. 4 which illustrates an example of such an accommodation assembly. The accommodation assembly may be located in the housing of the computer that hosts the system 10 with CPU 12, bus 16 and ultrasonic device 18 described in the previous figures.

As shown in FIG. 4, a laptop housing 50 comprises moldings or molded extrusions 52 which define the corners of common paper sizes. Paper placed with the corners in the molded extrusions has a defined relationship with microphones 54, which are also built into the housing 50.

In general it is assumed that using writing as input and using the keyboard as input are mutually exclusive, so in this embodiment the paper location is over the top of the keyboard. A retractable hood may cover the area of the keyboard indicated by reference numeral 56 to convert the area of the keyboard into a firm writing surface.

As an alternative to providing a hood, the screen flap 58 may be closed to provide a firm writing surface. Moldings such as those indicated by 52 may also be placed on the back of the screen flap 58, and the user can make notes which are stored on the computer without needing to open the laptop. The laptop itself can be in a standby state, as will be discussed below.

As shown in FIG. 4, there are sets of microphones on either side of the paper. A selector may poll the microphones in each set, or may poll the microphones individually and select those microphones which are receiving a clearer signal for continued use. Thus say right and left handed users may obscure certain microphones when they are writing, and the system may automatically switch to the best microphones for the current user.

Figure 5A:
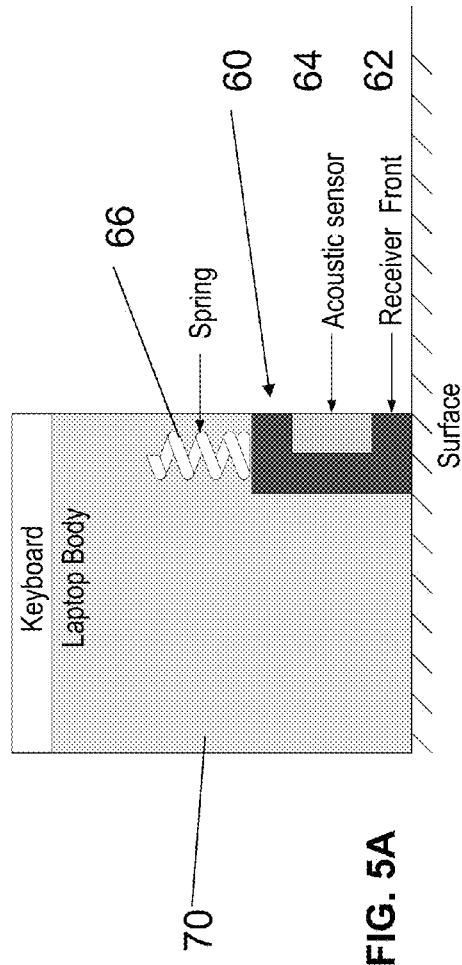
FIGS. 5A and 5B are schematic diagrams which illustrate an embodiment of the present invention in which the weight of the host is used to hold paper in position via a clip.
Figure 5B:
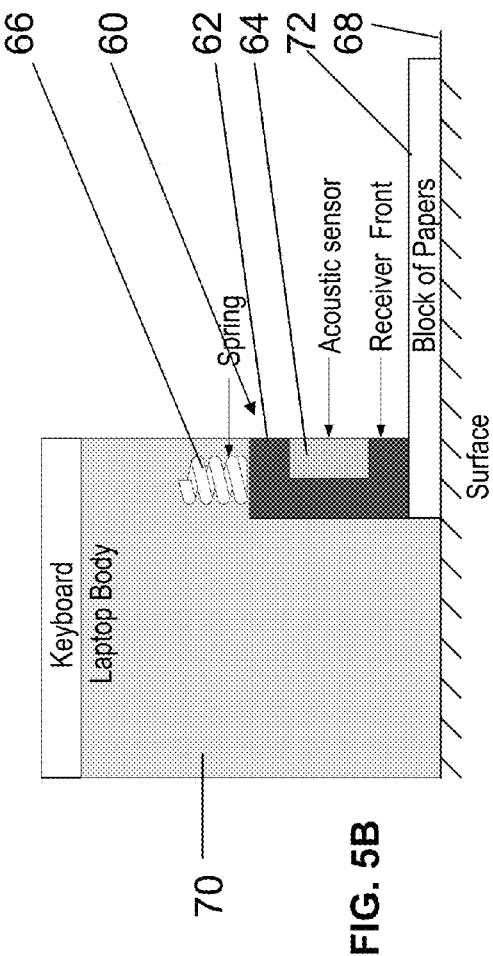

Reference is now made to FIGS. 5A and 5B. These figures illustrate a further embodiment in which the papers are held in a defined location but not in a way that interferes with the computer itself. That is to say the embodiment of FIGS. 5A and 5B relies on an external surface and does not obscure either the keyboard or screen, so the user can write on paper and still use the keyboard and see the screen.

A clip 60 contains a receiver front 62 and an associated acoustic sensor 64 and is tensioned by spring 66 against a surface 68. The housing 70 of the computer provides an alignment structure that defines an orientation for the paper and the paper 72 is held within the alignment structure as shown in FIG. 5B. The configuration again holds the paper in a fixed relationship with the microphones. The weight of the housing holds the paper in position.

Figure 6A:
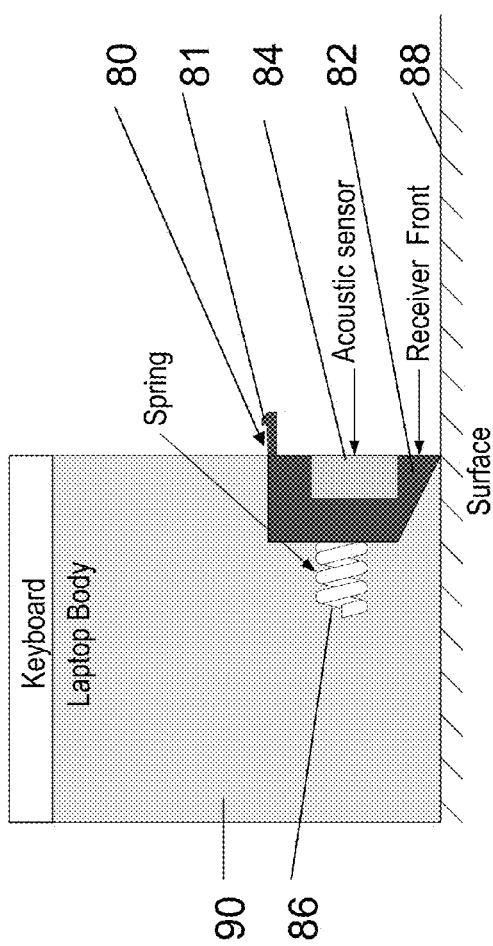
FIGS. 6A and 6B are schematic diagrams showing an alternative construction of the clip of FIGS. 5A and 5B in which the tension on the clip is rotary.
Figure 6B:
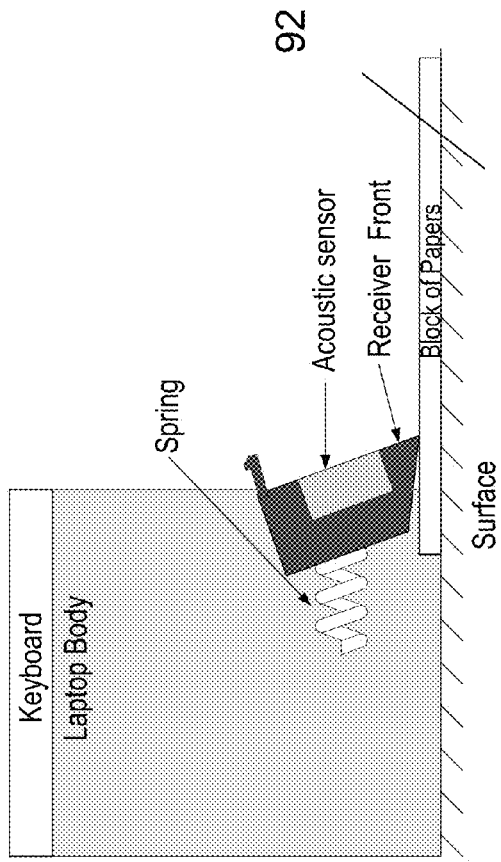

Reference is now made to FIGS. 6A and 6B. These figures illustrate an alternative to the embodiment of FIGS. 5A and 5B in which the papers are held in a defined location by a clip. In this case the clip is provided with rotary tension. Again, the embodiment of FIGS. 6A and 6B relies on an external surface and does not obscure either the keyboard or screen, so the user can write on paper and still use the keyboard and see the screen.

A clip 80 contains a lever 81 for manual raising of the clip to accommodate paper. A receiver front 82 and an associated acoustic sensor 84 are located in the body of the clip, which is tensioned by spring 86 against a surface 88. The housing 90 of the computer provides an alignment structure that defines an orientation for the paper and the paper 92 is held within the alignment structure. The status of the paper being held is shown in FIG. 6B. The configuration holds the paper in a fixed relationship with the microphones.

Housing 90 may include a holder for a stylus. In an embodiment the holder may include a recharging unit for recharging the stylus.

Reference is now made to FIG. 7, which shows an alternative embodiment of the paper alignment structure. In this case the paper alignment structure comprises a retractable paperweight 100. The microphones 102 are built into the paperweight and the paperweight is attached via cord 104 to the host computer 106. Cord 104 may be a serial cable connects the receiver to the host. In another embodiment, an "arm" with the sensors can unfold from the host's body. The paperweight 100 is placed over the paper or pad of paper 108. The underside of the paperweight may include grooves 110 as shown in exaggerated manner in inset 112 to precisely locate the corner of the paper.

After use the paperweight may be retracted into receptacle 114 in the host computer.

Each of the above-described embodiments may be enhanced by adding a suitably placed additional microphone so that the triangulation can be in three dimensions. When using a pad of paper where the thickness varies, accuracy can be enhanced by being able to take into account the thickness of the pad. Additional embodiments may use the stylus to point out edges and corners of three dimensional objects for input to a CAD program or other programs that require three-dimensional input.

Figure 8:
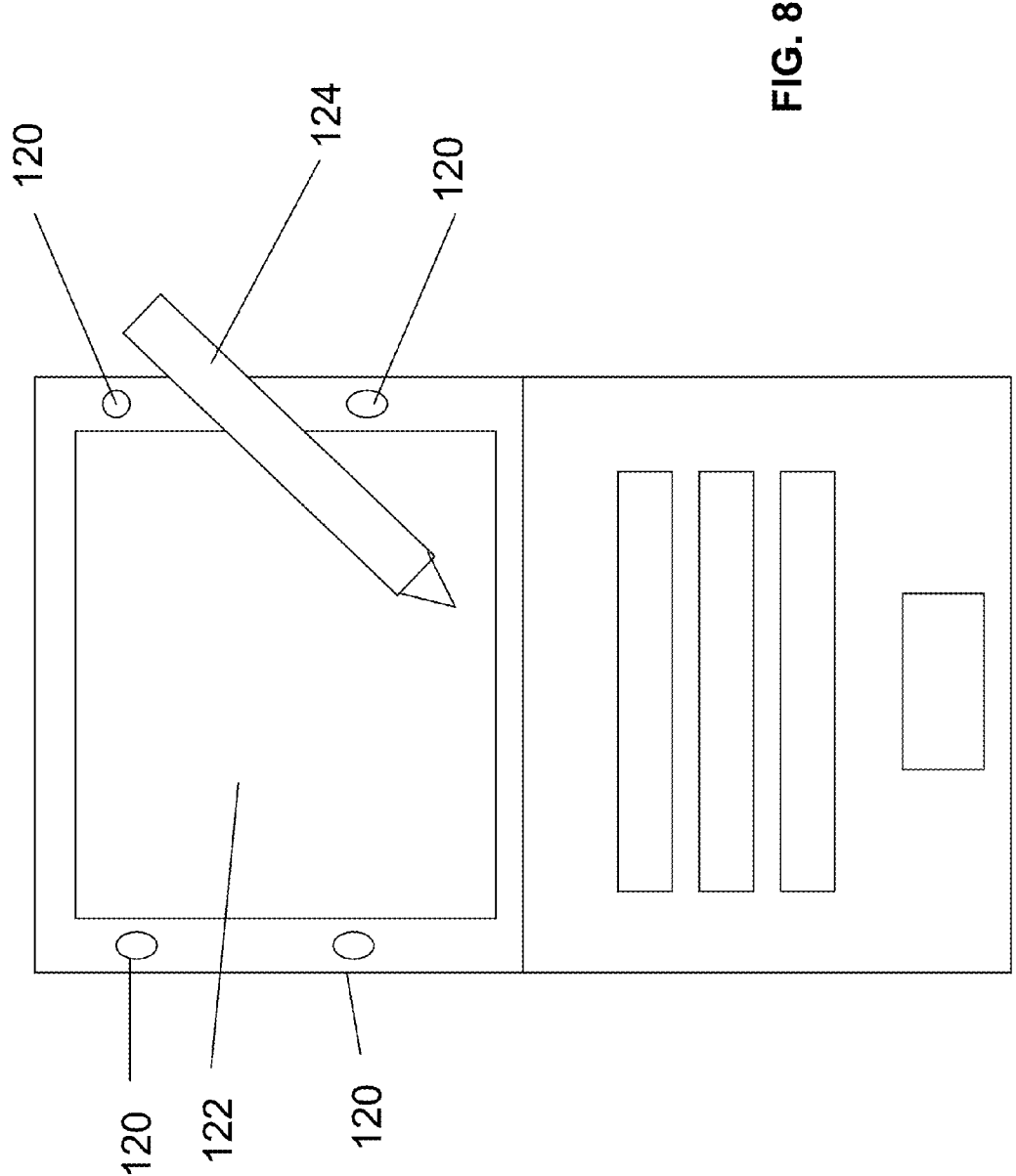
FIG. 8 is a schematic diagram showing an embodiment of the present invention in which the microphones are mounted in the housing around the screen, and the stylus interacts with active regions in the screen.

Reference is now made to FIG. 8, which is a schematic diagram illustrating an embodiment in which microphones 120 are placed in fixed arrangement to screen 122. The screen 122 displays active regions or a soft keyboard and the user operates stylus 124 in order to interact with the screen. Since the microphones are built in to the housing, the relationship between the location that the microphones measure and the regions on the screen is accurately known.

As discussed above in connection with the closed screen embodiment, storage of writing data does not need the host computer to be in an active state. Rather the host computer may be in a standby state in which many of the peripherals are switched off. Thus the user can write his notes using the stylus when the computer is in standby. The computer stores the data which will later be available when the computer is switched to an active state.

In an alternative embodiment, the digitizer comprises an on-board memory that stores user input while the host computer is in a dormant state. The user input is then available for downloading to the computing system when the computer is activated.

In yet an alternative embodiment the activation of the digitizer via the stylus switches the computing system from a dormant to an active state.

In most of the above embodiments it has been assumed that the paper is of a known size at a defined location. However it may not always be convenient to place the paper in such a location. The system may thus include a calibration mechanism which detects the size and direction of handwriting and uses that to deduce a location or orientation of the paper.

Issues relating to embedding a location digitizer, inside a host machine, whether for 2/D or 3/D locating, are now discussed in greater detail.

The ultrasonic digitizer/receiver 18-20 is embedded inside the host/desktop/MID. The receiver picks up ultrasonic signals which are digitized to 2/D, or 3/D coordinates.

The digitized data is interfaced to the main CPU by a system bus, such as a serial digital connection, like USB, UART, SPI, I2C or any other standard serial bus. Alternatively, the data can be interfaced by a parallel connection using a PCI, PCMCIA etc. buses.

Certain applications may require a strict physical relation between the paper or like writing surface and the receiver, thus necessitating mapping actual A4 or other standard size paper to the computer. For this purpose there may be provided a mechanical fixture to arrange such a connection. The sensors, microphones or transducers, may be placed at a known position in relation to the paper, at a pre-determined height, pre-determined location from the top of the paper and edges thereof etc. In particular, during the writing process, the paper ideally does not change its location in relation to the sensors, as this would have the side-effect of introducing a shift of the digitized handwriting in relation to the actual ink.

The placement of the microphones or other acoustic sensors may need acoustic engineering design, and may follow the guidelines as described in applicant's copending International Patent Application No. IB2008/050946, filed Mar. 14, 2008, and more particularly to section 4.5 in applicant's corresponding U.S. Provisional Patent Application No. 60/906, 813, filed 14 Mar. 2007, the contents of both of which are hereby incorporated by reference.

As discussed above, in one of the possible usage scenarios, the host may be in standby mode, while the acoustic receiver is turned on, either periodically or constantly, in order to pick up the acoustic or IR signals. The activation of the transmitter triggers a sequence of events that allows the host to process the data related to the transmission and thus digitize the location, storing the coordinate stream etc even though the host is otherwise in standby mode.

In an alternative embodiment, the receiver has its own memory to store the data. When the host is activated, the user can view the data that was stored.

As discussed, one alternative usage model is to regard the host as a paper pad while the host is in a folded state. One of its flat sides, say the bottom side of the host or the back of the screen, may be regarded as a table, and sensors may be provided thereon to pick up the signals when writing on the particular side of the housing.

In a further alternative, a plastic pad can be unfolded from the host to allow a pre-determined working area.

Another option, as discussed above, is to cover the keyboard with a retractable hood that in its extended state serves as a flat surface for writing.

Another option is to provide a digitization area in front of the keyboard, in like manner to the mouse finger pad that many hosts have.

The digitizer may be used for signature biometric authentication. In order to log on to the host computer, a user may be prompted to sign, thus allowing security without requiring the user to memorize a password.

In a further embodiment, when the user folds the screen, the digitizer may change its function automatically. For instance, when the screen is open, it may function as a mouse, and when it closes, it may start to save notes into a file.

In order to facilitate the usage of the technology, sensors may be embedded on the perimeter of the host. Sensors are then sampled periodically in order to find the area where the stylus is sending the signals. Once finding the closest sensors to the transmitted signals, other sensors may be ignored. This way, the host is able to adjust dynamically to left and right handed users.

As mentioned, if the user does not place the A4 paper firmly in the locations provided, there is an option for the computer software to calibrate virtual paper to accommodate the handwriting. The inputs for such a calibration process may include an area bounding the handwriting, and also the direction of the writing, which may imply the direction of orientation of the paper.

In order to save the cost of hardware components inside the host, the receiver's hardware may share some of the sensors with other functional blocks of the host. Such is true for both an IrDA sensor, and for the microphones.

The sharing of components gives rise to two embodiments, a module integration embodiment and a deep integration embodiment. The module integration embodiment is in general as described above, and uses USB, UART, SPI buses and the like to pass coordinates, or at least a digital audio signal carrying the coordinates, to the central processor. In an alternative embodiment, instead of coordinates, the audio data that exits the CODEC may be output to the bus to pass to the central processor.

The deep integration embodiment uses the host's native interface to sample the EPOS signals. A proposed architecture is as shown in FIG. 9.

Figure 9:
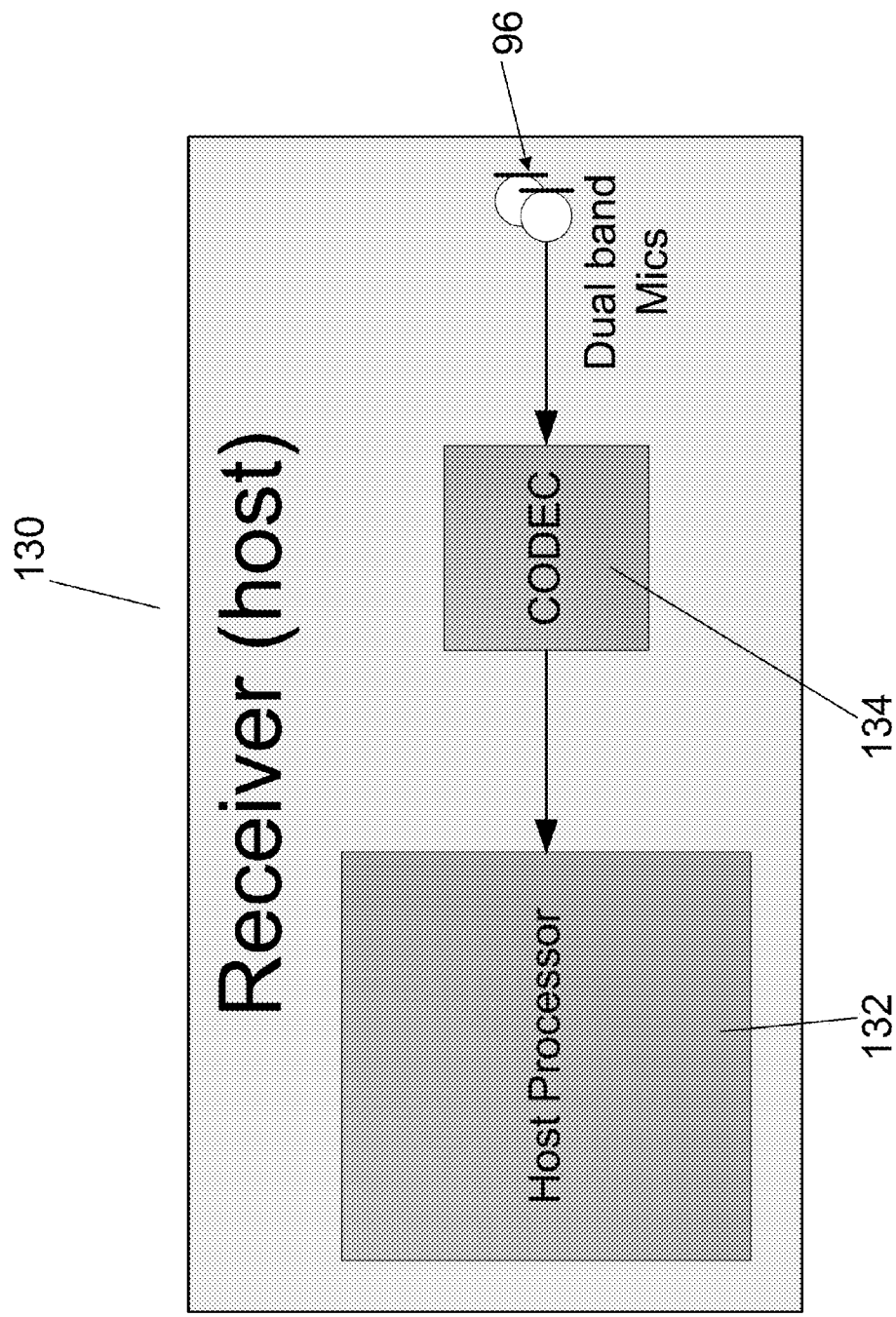
FIG. 9 is a schematic diagram showing an architecture for deep integration of the ultrasonic location system into a host, where determination of the location is carried out by the processor and an internal codec.

FIG. 9 shows a basic architecture, in which a host 130 comprises a mostly digital unit manufactured with a small silicon process in order to make it as small as possible. A CODEC 134 forms a companion to the processor, coprocessor, which takes care of most of the analog signal conditioning, for example voltage regulation, ADC, say for microphones input, DAC, say for output to speakers, vibration etc. Because of the analog nature of the CODEC 134, it is usually manufactured using a larger geometry than the main processor 132. In some cases, the CODEC functionality may be integrated into the processor 132 itself. Since CODECs are manufactured to support audio frequencies, they are often optimized for input signals which are below 20 KHz. For ultrasonics, such a frequency range is not sufficient and the CODEC in use needs to support enough resolution at ultrasonic frequencies, say above 40 dB at 50 KHz (a typical example). FIG. 9 shows an embodiment with two dual band microphones 96.

Figure 10:
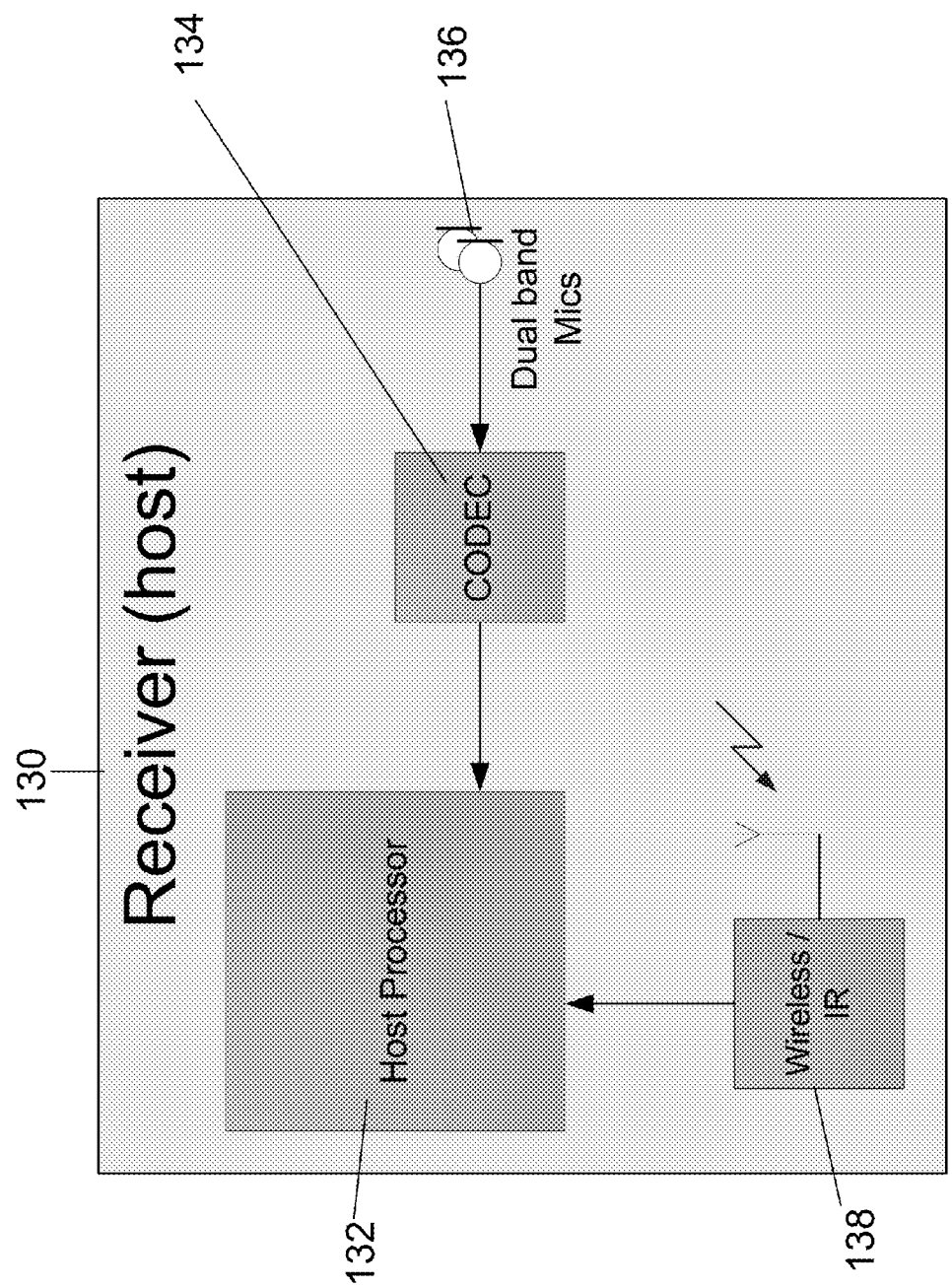
FIG. 10 is a schematic diagram illustrating a variation of the embodiment of FIG. 9 in which a transmitter used for synchronization accepts data from a third microphone.

Reference is now made to FIG. 10, which is a simplified diagram showing the host of FIG. 9 with an additional wireless or IR receiver 138, already providing the synchronization link, to additionally incorporate a third microphone. If there are three microphones, there is enough information to decode the position of the transmitter. However, the usage of 3 microphones and no data link incorporates additional problems such as encoding the data on the acoustic signal (data can be switch status on the pen side). As shown, an IR or RF link 138 supports both synchronization and data transfer. The block diagram in this case will be:

The wireless link 138 may use a protocol which is already supported by the host, such as Bluetooth, WiFi, etc or a subset of those.

There is an inherent issue in this architecture for synchronization: each of the blocks has its own clock source; yet it is necessary to synchronize the software which runs on the processor so that the processor is synchronized with the transmitter (not shown)

The synchronization is performed in 2 phases:

1) CODEC to CPU Synchronization

Upon an overflow of the acoustic samples buffer, an internal interrupt is generated. The ISR that handles this interrupt, reads the free running timer value to obtain a time stamp. Since this interrupt may be masked by higher priority processes, the jittering of the timer value may be relatively large. However, this process may start way before the location application begins to run, so any resulting timing errors may be filtered by the passing of sufficient data.

2) Transceiver to CPU Synchronization

Upon receiving a valid packet by the transceiver 138, which as mentioned may be RF or IR, an interrupt is generated. The ISR that handles the interrupt reads the free running timer value to obtain a time stamp. This interrupt should be with the highest priority, so the jittering of the time stamp due to software execution will be minimal.

Figure 11:
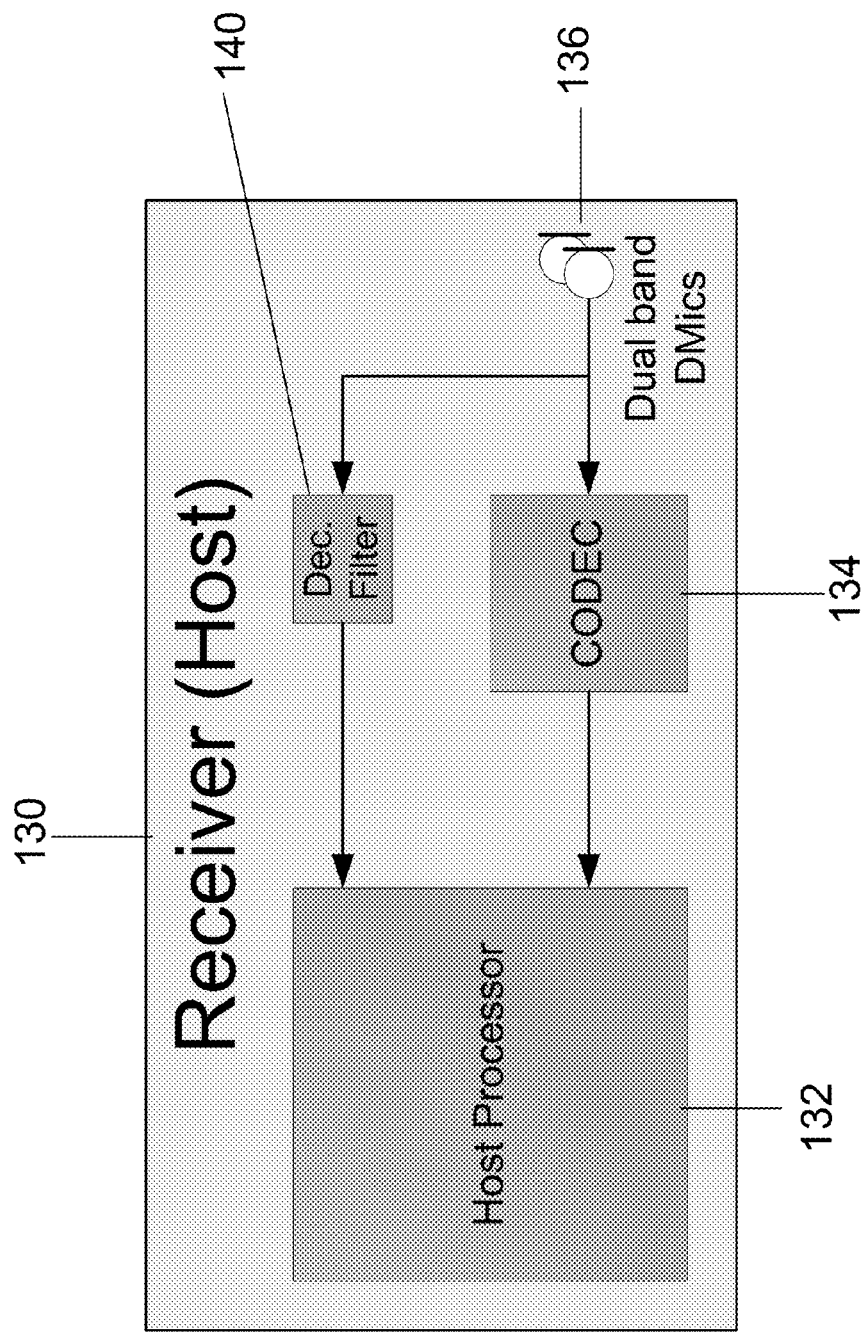
FIG. 11 is a schematic diagram illustrating a variation in which a decimation filter is placed in parallel with the codec to deal with cases in which the codec is not optimized for ultrasonic frequencies.

An additional approach is to use digital microphones (DMIC). However it may be that the internal CODEC does not support the ultrasonic range. The straight forward approach is thus to use the architecture shown in FIG. 11. FIG. 11 shows a decimation filter 140 connected between the dual band microphones and the host processor in parallel with the Codec.

The CODEC 134 provides the clock signals to the microphones, and also to the dedicated "Decimation Filter" ASIC 140. The outputs of the DMICs 136 are routed both to the CODEC and to the ASIC 140. The output of the ASIC 140 is interfaced to the host 132 by a serial interface such as UART, I2S, SPI etc.

A receiver module according to the above embodiments, may be used to enable a touchscreen application, as discussed in respect of FIG. 8 hereinabove. The screen may include soft buttons and active areas but rather than the screen actually being a touchscreen and sensing the stylus, the digitizer detects its location over the active areas and interprets the interaction accordingly.

The addition of a 3rd microphone to the host as discussed above, particularly with respect to FIG. 10, may enable numerous kinds of applications using 3/D data. Several specific ideas are mentioned here but in non-limiting manner:
1. Handwriting: compensating for the height of the paper.
2. 3/D gestures: a 3/D device can transfer the 2/D working environment of the screen to a 3/D environment.
3. 3/D applications: mechanical design, graphical design, gaming.

The stylus may further serve as a remote control, sending commands to the host such as: play, page up, page down etc.

When the host screen is folded, the stylus may change its function and start to control a 2nd device, such as a projector.

The calibration of a receiver as described herein is preferably carried out prior to being assembled inside a host. In one approach, the receiver is calibrated, with its acoustic front, at the module level. Therefore, the module should be designed to enable such a calibration.

A further embodiment uses a wired pen. In this case the synchronization needed is just between the CPU and its CODEC.

An Interface IC may be used. Such an interface IC may be a dedicated IC, or an off the shelf component such as an EEPROM. An EEPROM can output in a periodic manner a waveform that is encoded digitally, for example sigma delta format. A passive network may interface the pen and IC network to the ultrasonic transmitter.

An additional embodiment includes a temperature sensor as part of the positioning mechanism. The temperature sensor allows for the positioning system to compensate for measurement inaccuracies of various kinds caused by temperatures and associated offsets, and thus improve the positioning accuracy. One of the sources of temperature-based inaccuracy is that the speed of sound depends on temperature. Thus temperature compensation adds accuracy to the application.

The pointing device, stylus, pen etc, may be battery powered and may be rechargeable.

Figure 12:
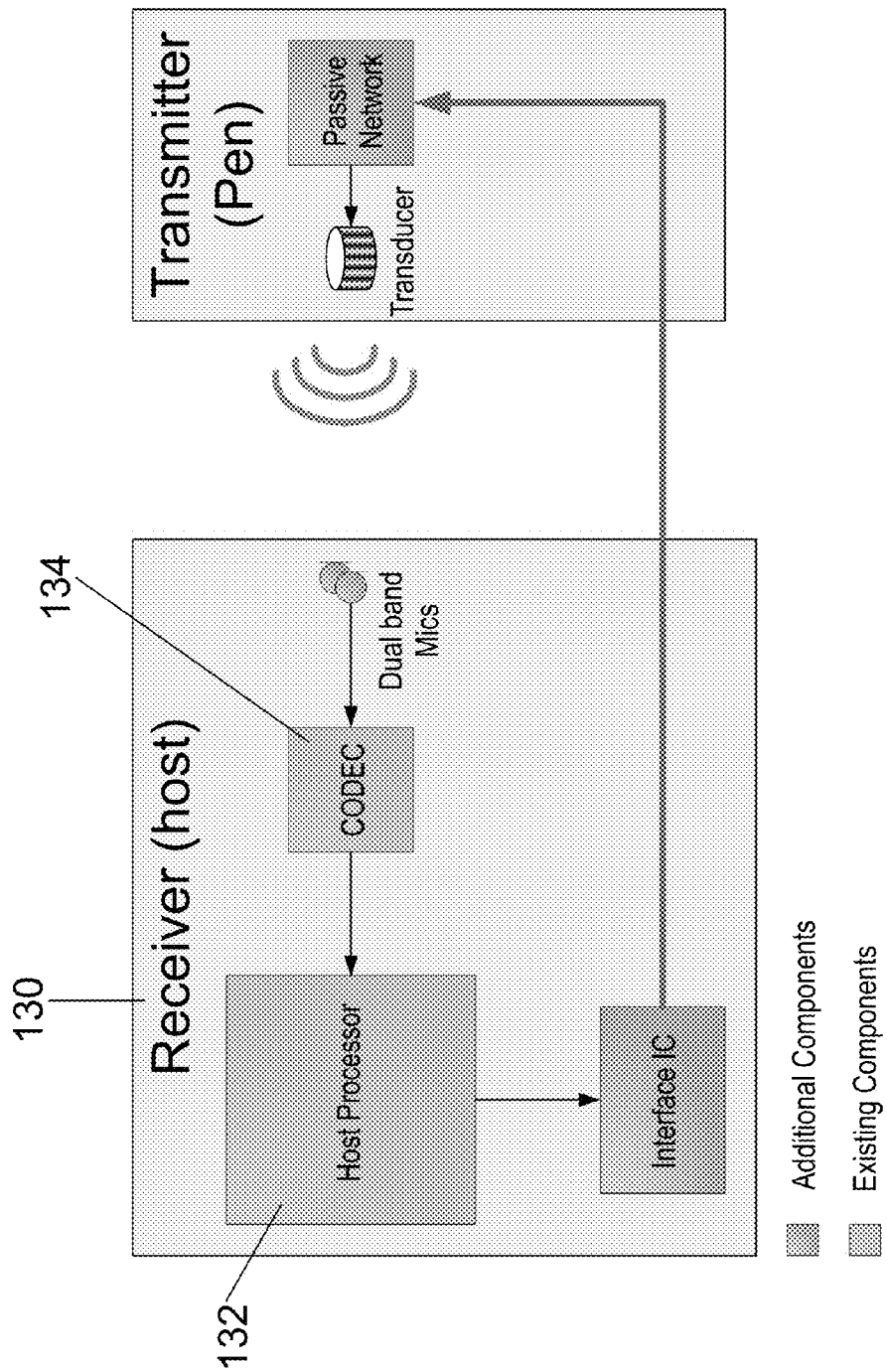
FIG. 12 is a schematic diagram illustrating an integration of a positioning system according to the above embodiments onto a host processor, the integration involving reuse of existing components on the host system.

Reference is now briefly made to FIG. 12, which illustrates a positioning according to the embodiments described above. A host system integrates the position by use of its existing components. An existing host processor 132 and CODEC 134 perform the functions that the positioning system requires.

A pressure sensor may digitize the pressure the user puts on the pen. Such digitizing may add a more 'realistic' feedback to the digital representation. The pressure data may be passed through the IR/Rf link, or alternatively may be modulated, along with the positioning data, onto the ultrasound signal.

The term "stylus" is used herein to refer to any pointing device used as a locator which sends an ultrasonic signal. The stylus may be wireless.

It is expected that during the life of a patent maturing from this application many relevant digitization technologies will be developed and the scope of related terms such as "digitizer" are intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:
1. A computing system comprising:
a processor having a clock;
internal peripheral devices;
a CODEC external to said processor; and
a system bus connecting said internal peripheral devices to said processor;
wherein:
one of said internal peripheral devices comprises an ultrasonic digitizer configured for digitization of ultrasonic frequencies, said digitizer digitizing ultrasonic signals from at least two associated microphones into a corresponding digitized audio output and outputs said digitized audio output as a signal on said system bus;
said digitized audio output comprises a decoded positioning device location;
said ultrasonic digitizer is connected to said CODEC to use said CODEC to decode said location; and
said CODEC is synchronized with said clock.

2. The computing system of claim 1, further comprising a stylus, the stylus incorporating an ultrasonic transmitter for transmitting its location to said associated microphones to allow user interaction with said computer system, the stylus further comprising a tip for pointing over a surface.

3. The computing system of claim 2, wherein said tip is a writing tip, and is ink enabled to write on paper, and said system comprises an accommodation assembly for accommodating paper in a defined relationship with said system.

4. The computing system of claim 3 comprising a host computer housing, wherein said paper accommodation system comprises a paper alignment structure, said paper alignment structure comprising a configuration that holds paper in a fixed relationship with said at least two microphones.

5. The computing system of claim 4, wherein said paper alignment structure is built onto said housing.

6. The computing system of claim 5, wherein said paper alignment structure configures a part of said housing as a writing pad.

7. The computing system of claim 5, wherein said housing comprises a keyboard and a covering is extendable over said keyboard to form said writing pad.

8. The computing system of claim 4, wherein said paper alignment structure comprises a first set of at least two microphones about one side thereof and a second set of at least two microphones about a second side thereof and a selector for selecting between microphones of said respective sides depending on which are receiving a clearer signal.

9. The computing system of claim 4, wherein said housing comprises a recharging holder for a stylus.

10. The computing system of claim 4, wherein said paper alignment structure comprises a tensioned clip to hold paper against said housing.

11. The computing system of claim 10, wherein said tension is one member of the group consisting of rotary tension and linear tension.

12. The computing system of claim 4, wherein said paper alignment structure comprises a retractable paperweight, said at least two microphones being built into said paperweight, said paperweight being attached via a cord to said host.

13. The computing system of claim 1, further comprising a third microphone for three-dimensional location.

14. The computing system of claim 13, configured to use said three-dimensional location to compensate for a height of paper in calculating said location.

15. The computing system of claim 1, configured such that activation of said digitizer switches said computing system from a dormant to an active state.

16. The computing system of claim 1, wherein said digitizer comprises a memory that stores user input while said computing system is in a dormant state, which user input is subsequently accessible by said computing system.

17. The computing system of claim 1, configured to accept input from said digitizer while remaining in an otherwise dormant state.

18. The computing system of claim 1, configured with a calibration mechanism for detecting size and direction of handwriting and deducing a location or orientation of paper.

19. The computing system of claim 1, comprising a computer housing and wherein said at least two microphones are in a fixed relationship with respect to said housing.

20. A computing system comprising:
a processor having a system clock; and
a positioning unit for providing positioning of a positioning device;
wherein said processor is coupled to a CODEC, external to said processor, that digitizes ultrasonic signals of said positioning device received via at least two associated microphones, to provide said processor with a signal further processable into a corresponding positioning device location, and a synchronization unit for synchronizing said system clock for said provided positioning;
wherein said synchronizing for said provided positioning comprises synchronizing said CODEC with said system clock.

21. The computing system of claim 20, further comprising a filter in parallel with said CODEC.

22. The computing system of claim 20, further comprising a wireless unit that synchronizes with a pointing device, which unit is further configured for receiving data from an additional microphone.

23. The computing system of claim 20, configured to use a location signal modulated onto a continuous ultrasonic carrier.

24. The computing system of claim 20, further comprising a screen and wherein said at least two associated microphones are fixed about said screen to provide a touchscreen application.

25. The computing system of claim 20, wherein the system comprising a wireless transceiver for synchronization with a pointing device, and said synchronizing for said provided positioning comprises synchronizing said system clock to said wireless transceiver.

26. The computing system of claim 22, wherein said wireless unit is a system internal unit for wireless networking.

27. A computing system comprising:
processing means having a clock;
at least two sensing means for receiving ultrasonic signals from a positioning device; and
decoding means external to said processing means, said decoding means including a synchronizing means;
wherein said decoding means digitizes said ultrasonic signals received via said at least two sensing means and provides said processing means with a positioning signal;
wherein said processing means processes said positioning signal to determine a corresponding positioning device location; and
wherein said synchronizing means synchronizes said decoding means with said clock.

28. The computing system of claim 27, further comprising a filtering means in parallel with said decoding means.

29. The computing system of claim 27, further comprising a wireless communication means that synchronizes with a pointing device, said wireless communication means being configured for receiving data from an additional sensing means.

30. The computing system of claim 27, further comprising a display means and wherein said at least two sensing means are fixed about said display means to provide a touchscreen application.

31. A method of detecting a location of a positioning device, the method comprising:
receiving ultrasonic signals from said positioning device using at least two microphones;
digitizing said ultrasonic signals using an external CODEC;
decoding said digitized ultrasonic signals using said external CODEC to generate a positioning signal;
processing said positioning signal to determine said location of said positioning device; and
synchronizing said external CODEC with a processor clock.

32. The method of claim 31, further comprising filtering said ultrasonic signals in parallel with said digitizing and decoding.

33. The method of claim 31, further comprising:
receiving additional ultrasonic signals from a pointing device using an additional microphone; and synchronizing said pointing device with said processor clock.

34. The method of claim 31, further comprising outputting said positioning signal over a bus to a processor, wherein said processor performs said processing.

35. A non-transitory medium storing instructions for causing a device to:
- receive ultrasonic signals from a positioning device using at least two microphones;
- digitize said ultrasonic signals using a CODEC external to a processor;
- decode said digitized ultrasonic signals using said CODEC to generate a positioning signal;
- process said positioning signal at said processor to determine said location of said positioning device; and
- synchronize said external CODEC with a processor clock.

* * * * *